(12) United States Patent
Chessell et al.

(10) Patent No.: US 6,499,063 B1
(45) Date of Patent: Dec. 24, 2002

(54) CLIENT/SERVER COMPUTING FOR TRANSACTION PROCESSING WITH SUPERIOR COORDINATOR OPTIMIZATION

(75) Inventors: Amanda Elizabeth Chessell, Alton (GB); Gordon Douglas Hutchison, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,799

(22) Filed: Jun. 25, 1999

(30) Foreign Application Priority Data

Feb. 18, 1999 (GB) .............................................. 9903629

(51) Int. Cl.[7] ................................................. G06F 9/44
(52) U.S. Cl. ........................ 709/315; 709/101; 709/201
(58) Field of Search ................................ 709/105, 203, 709/208

(56) References Cited

U.S. PATENT DOCUMENTS

| | | | |
|---|---|---|---|
| 5,815,710 A | * 9/1998 | Martin et al. | 709/316 |
| 5,983,233 A | * 11/1999 | Potonniee | 707/103 R |
| 6,070,197 A | * 5/2000 | Cobb et al. | 707/10 |
| 6,226,788 B1 | * 5/2001 | Schoening et al. | 709/203 |
| 6,317,773 B1 | * 11/2001 | Cobb et al. | 709/101 |

FOREIGN PATENT DOCUMENTS

| | | |
|---|---|---|
| EP | 702295 | 3/1996 |
| EP | 834807 | 4/1998 |
| GB | 2 303 474 | 2/1997 |
| WO | WO 98/54659 | 12/1998 |

\* cited by examiner

*Primary Examiner*—David Wiley
*Assistant Examiner*—George Neurauter
(74) *Attorney, Agent, or Firm*—A. Bruce Clay

(57) ABSTRACT

A method of operating a first server data processing apparatus for use in coordinating a distributed transaction which is carried out by a plurality of server data processing apparatuses is disclosed, the method having steps of: receiving a registration request from a second server data processing apparatus; determining a machine address of the second server data processing apparatus that sent the registration request; keeping a list of the machine addresses of server data processing apparatuses that send registration requests to the first apparatus; determining the destination machine address of an outbound transactional request; determining whether the destination machine address of the outbound transactional request is included in the list of machine addresses kept by the keeping step; and when the destination machine address of the outbound transactional request is included in the list of machine addresses, substituting an identifier in the outbound transaction request identifying a transaction coordinator located on the first server apparatus with an identifier identifying a transaction coordinator located on the server apparatus having the destination machine address of the outbound transactional request.

11 Claims, 4 Drawing Sheets

CLIENT/SERVER COMPUTING FOR TRANSACTION PROCESSING WITH SUPERIOR COORDINATOR OPTIMIZATION

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA-the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for coordinating these distributed transactions.

An application running on a client process begins a transaction which may involve calling a plurality of different servers, each of which will initiate a server process to make changes to its local data according to the instructions contained in the transaction. The transaction finishes by either committing the transaction (and thus all servers finalize the changes to their local data) or aborting the transaction (and thus all servers "rollback" or ignore the changes to their local data made during the transaction). To communicate with the servers during the transaction (e.g., instructing them to either commit or abort their part in the transaction) one of the processes involved must maintain state data for the transaction. According to the OTS standard, this involves the process setting up a series of objects, one of which is a coordinator object which coordinates the transaction with respect to the various servers.

The main purpose of this coordinator object is to keep track of which server objects are involved in the transaction, so that when the transaction is finished, each server object involved in the transaction can be told to commit the changes made locally to the local database associated with that server object, in a single unified effort. This ensures that no server object makes a data change final without the other server objects which are also involved in the same transaction doing so. Thus, each server object which is to join a transaction must first register with the coordinator object so that the coordinator object will know of the server object's existence, its wish to join the transaction, and where to find the server object (e.g., which server machine the server object resides on) when it comes time to complete the transaction (where the coordinator object instructs all server objects to make the changes to their respective local data final).

A server object responsible for updating data (referred to hereinbelow as a resource object) gets involved in a transaction when another server object (or the original client object which started the transaction) sends a request to the resource object for the resource object to do some work. This latter request carries some information, called the transaction context, to inform the resource object that the request is part of a transaction. Once a resource object finds out that it is to be involved in a transaction, it then makes a registration request with the coordinator object.

When the resource object is located in a different operating system process from the coordinator object, it has been found to be useful in the prior art (e.g., the CORBA OTS standard, including IBM's implementation thereof in IBM's Component Broker software product, released in 1997) to use a subordinate coordinator object (222 in FIG. 2) located in the same operating system process as the resource object (223 or 224). The main coordinator object is then called the "superior coordinator object" 211. During registration of a resource object 223 to the transaction, the subordinate coordinator 222 is set up locally inside the server machine 22 which houses the resource object 223 and the resource object 223 communicates directly with this subordinate coordinator object 222 when it makes a registration request. (It should be noted that while the term "server machine" is used here, the term "server process" could also be used, to thus indicate that the distributed server objects could, in fact, be located on the same server machine but on different operating system processes running on the server machine, and hereinafter the term "server" will be used to refer to both terms.) The subordinate coordinator 222, in turn, registers itself with the superior coordinator object 211 (which is located in another process possibly on another server machine as if it were a resource object).

The subordinate coordinator object 222 thus provides a representation of the existence of the transaction within the server housing the resource object. Instead of communicating directly with the superior coordinator object 211, the resource objects 223 and 224 first communicate with their local subordinate coordinator object 222 which in turn communicates with the superior coordinator object. This greatly reduces the number of cross-operating-system-process calls.

With this prior art architecture, there are still many inefficiencies that result. For example, assume that there are two machines involved in a transaction: one machine containing the business logic and another machine containing the data logic. The superior coordinator is set up in a process running on the machine containing the business logic and the resource objects are located in the machine containing the data logic. The machine containing the data logic has two server processes running in it and each such process has resource objects which are involved in a distributed transaction. Therefore, two separate subordinate coordinators will be set up, one in each of the server processes. Each subordinate coordinator in the machine containing the data logic then sends inter-machine messages (e.g., using TCP/IP) to the superior coordinator in the machine containing the business logic in order to progress the transaction. Thus, there are still many inter-machine data flows occurring with this software architecture of the prior art.

SUMMARY OF THE INVENTION

According to a first aspect, the present invention provides a first server data processing apparatus for use in coordinating a distributed transaction which is carried out by a plurality of server data processing apparatuses, the first apparatus having: a means for receiving a registration request from a second server data processing apparatus; a means for determining a machine address of the second server data processing apparatus that sent the registration request; a means for keeping a list of the machine addresses of server data processing apparatuses that send registration requests to the first apparatus; a means for determining the destination machine address of an outbound transactional request; a means for determining whether the destination machine address of the outbound transactional request is included in the list of machine addresses kept by the means for keeping; and a means for, when the destination machine address of the outbound transactional request is included in the list of machine addresses kept by the means for keeping, substituting an identifier in the outbound transaction request identifying a transaction coordinator located on the first server apparatus with an identifier identifying a transaction coordinator located on the server apparatus having the destination machine address of the outbound transactional request.

According to a second aspect, the present invention provides a method of carrying out the functionality recited above concerning the first aspect.

According to a third aspect, the invention provides a computer program, stored on a computer-readable storage medium, the program having program elements for, when run on a computer, performing the method set forth in the second aspect of the invention.

Thus, the present invention consolidates a group of subordinate coordinators that are located on the same machine such that only one such subordinate coordinator needs to communicate directly via inter-machine data with the superior coordinator (which is running on another machine). This greatly reduces the number of inter-machine data transfers that would otherwise be required.

BRIEF DESCRIPTION OF THE DRAWINGS

The invention will be better understood by the below description of preferred embodiments thereof to be read while referring to the following figures.

DETAILED DESCRIPTION OF THE EMBODIMENTS

In order to illustrate a preferred embodiment of the present invention, a typical example of a three-tier distributed transaction processing architecture will be used, with the first tier being a client machine's interface to the transaction (such a tier typically being run on a personal computer workstation), the second tier being a business logic tier typically residing at a department server level, and a third tier being a data logic tier typically residing in a machine (or machines) that are used as database servers.

Figure 1:
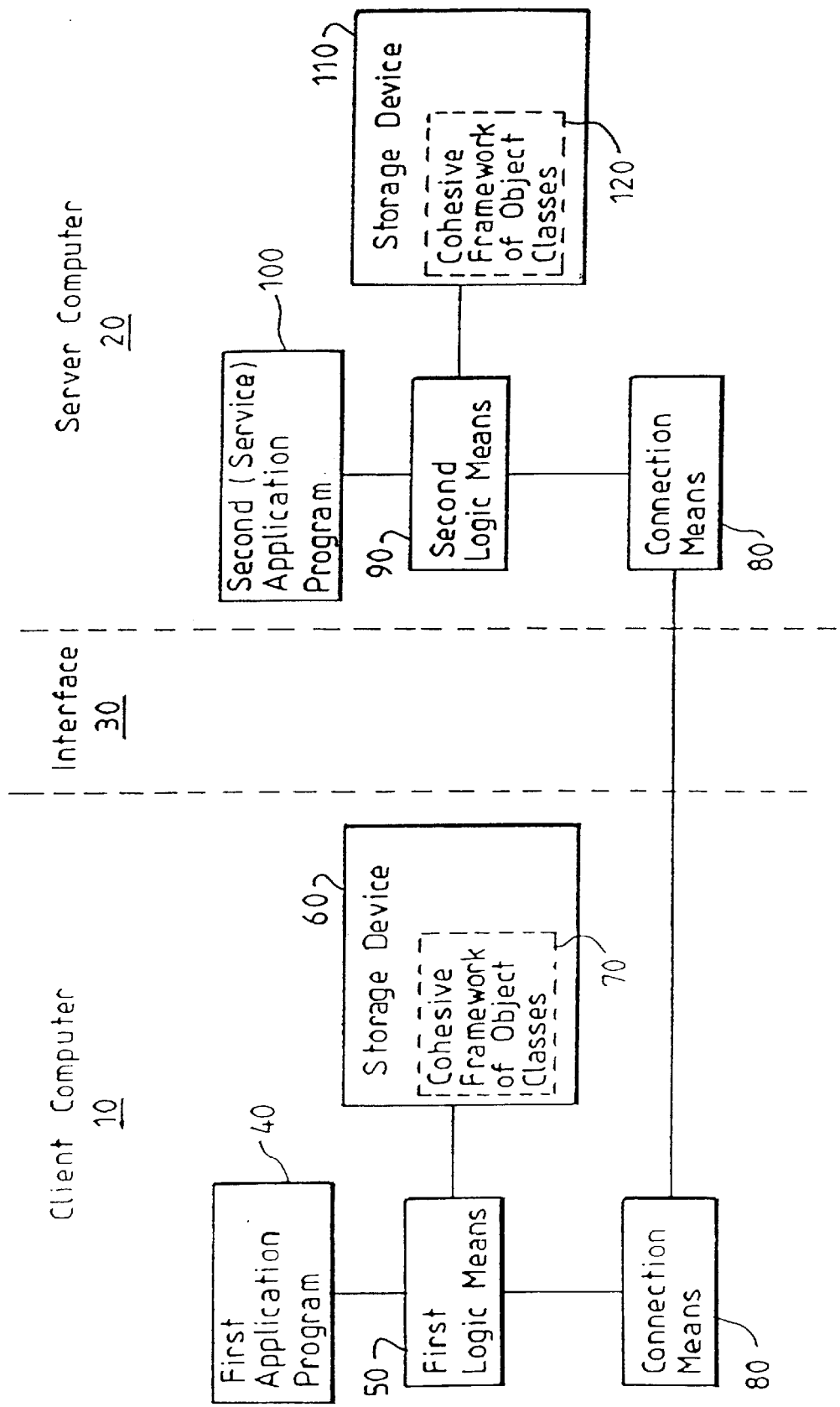
FIG. 1 is a block diagram of a well-known heterogeneous client/server architecture using object technology, in the context of which preferred embodiments of the present invention can be applied.
Figure 2:
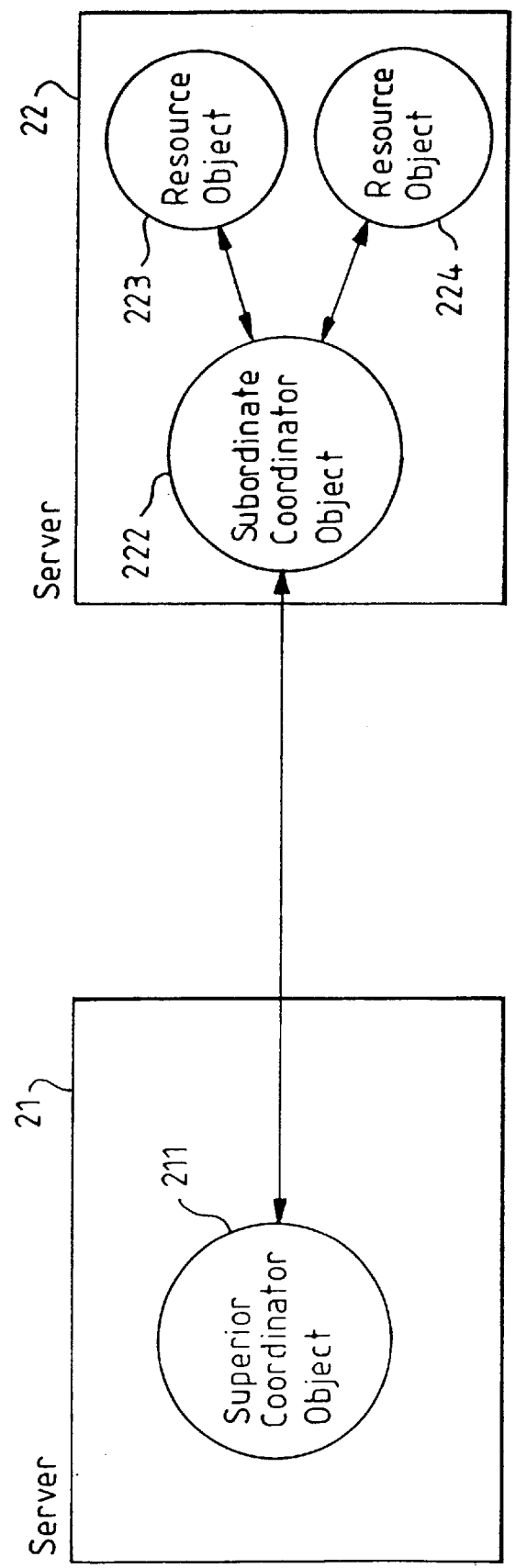
FIG. 2 is a block diagram showing the various objects instantiated within two co-transactional servers according to a conventional design in the context of which the preferred embodiment of the present invention is applied.
Figure 3:
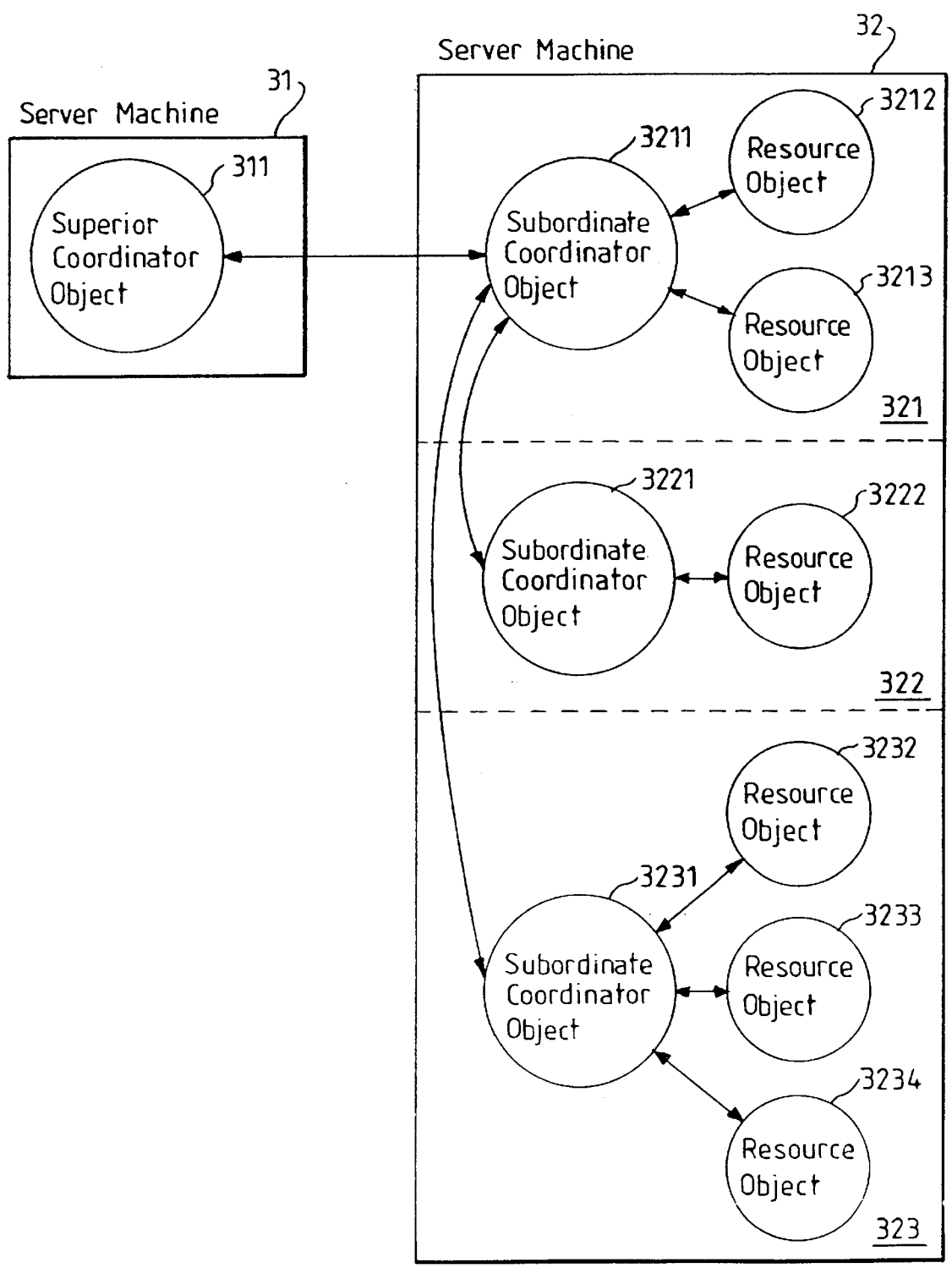
FIG. 3 is another block diagram showing the various objects instantiated within two co-transactional servers according to a preferred embodiment of the present invention.

In FIG. 3, a server machine 31 is running a process which includes a superior coordinator object 311. For example, this process is involved in the second-tier processing of business logic for the running of a distributed transaction that has been started by a first-tier client machine (not shown) which has previously sent a transaction begin request (or command) to the server machine 31.

A second server machine 32 is running three different processes 321, 322 and 323, each of which is involved in the processing of third-tier data logic for the running of the distributed transaction. In process 321, subordinate coordinator object 3211 communicates directly with resource objects 3212 and 3213, each of which are involved in the transaction. In process 322, subordinate coordinator 3221 communicates directly with resource object 3222, which is involved in the transaction. In process 323, subordinate coordinator object 3231 communicates directly with resource objects 3232, 3233 and 3234, each of which is involved in the transaction.

In the prior art, each subordinate coordinator 3211, 3221 and 3231 would send separate inter-machine data flows to the superior coordinator object 311 during the processing of the distributed transaction. In the preferred embodiment of the present invention, subordinate coordinator objects 3221 and 3231 communicate their transactional results directly to subordinate coordinator 3211 which then relays such results, along with object 3211's own results, to the superior coordinator object 311 in machine 31. This thus cuts down significantly on the number of inter-machine data flows, and instead requires only inter-process data flows on the same machine, which are much quicker to carry out since there is no need, for example, to carry out remote TCP/IP connections (since the processes are running on the same machine).

A description will now be given of how the subordinate coordinator objects that are located on the same machine are made to aggregate their transactional data flows before sending an aggregate data flow across the machine boundary to the superior coordinator object.

The server machine process which includes the superior coordinator 311 achieves this by:
1) determining the host machine location of remote subordinate coordinators (i.e., 3211, 3221 and 3231) as they register with the superior coordinator object 311;
2) subsequently determining the destination host machine of outbound transactional requests (e.g., requests being sent from the business logic tier to the data logic tier);
3) if there is a subordinate coordinator already created locally (i.e., on the same machine) to the outbound request's destination—substituting the object reference for the remote subordinate coordinator that is "machine-local" to the target object in place of the object reference for the superior coordinator for the transaction in the propagation context that accompanies the outbound request.

The preferred embodiment makes use of the structure of the specified format for stringified object references. A method is provided that operates on all Corba objects called object_to_string. This method produces a string version of the object reference that can be saved, passed to other systems etc and turned back into an object reference using string_to_object.

Actually, the string is really a string form of the Interoperable Object Reference (IOR) for the object. Such a CORBA::IOP::IOR structure is fully specified in CORBA 2.0 specification. The format for these is described by the Corba 2.0 General Inter-Orb Protocol (GIOP) when completed by the CORBA IOP protocol for the specific transport mechanism used by the ORB.

Part of an IIOP ORB's IOR is the host machine IP address. Thus it is easy to determine the host machine from an object reference (this is the mechanism that allows a method to be sent to a remote object using its object reference, the ORB extracts the host and port from the reference and sends the request off to the remote system for processing).

From an application (or transaction service) point of view this can be done without using any internal ORB methods:

one could merely call obj.object_to_string and examine the string using the data formats buried in the Corba 2.0 specification to obtain the host address. Alternatively, one could use knowledge of provided internal ORB functions that do the same thing if desired i.e., perhaps it could be done more efficiently by the ORB's internal code.

The preferred embodiment of the present invention makes a novel use of the propagation context that is passed between transactional servers when requests are flowed between processes. Specifically we are interested in the request from a subordinate coordinator that has had a resource registered with it and is registering a resource in turn with it's superior coordinator. In this flow, the propagation context will normally not contain any transaction information for 'resuming' purposes as we are concerned here with the context flowed back on a reply. However this propagation context contains a data area that can be used for 'implementation specific' purposes. It also contains a slot (unused in the reply flows) within it for a coordinator reference within the TransIdentity field.

On this registration request from the subordinate coordinator to the superior coordinator we place into the propagation context the object reference of the new subordinate coordinator created in the process performing the registration operation. (Either data area in the propagation context can be used. It does not matter much, but as 'checked transaction' checking of replies is done using the otid transaction id, we can safely place it in the coordinator slot of the TransIdentity structure.)

A similar process could be used in the case of 'deferred registration' where the equivalent of the register_resource request is piggy-backed onto the reply from the request.

When the request is received in the process containing the superior coordinator (e.g., 311), the standard orb-interceptor for the 'received-request' already examines the type of the target objects and the propagation context. A simple extension allows the interceptor to extract the object reference of the remote coordinator from the sending process.

The Coordinator::register_resource interface method is extended to check if the resource registration has a corresponding remote subordinate coordinator reference associated with it. If this is so, the coordinator processing the registration extracts the object reference of the subordinate coordinator. It examines the object reference to determine the IP address of the host where it was created. (This could just as easily be passed along with the reference above if desired.)

The coordinator maintains a table of such remote subordinate transaction coordinators involved in the transaction. The table is a mapping from IP address to coordinator references that are already constructed in those remote machine hosts and involved with the transaction. Typically this table will be small so the performance overhead it not likely to be at all significant.

A final step is necessary. Currently, in the sending_ request ORB interceptor, when a transactional request flows to a remote server a reference to the local (superior) coordinator is placed in the propagation context. Thus currently, any transaction involvement and resource registrations will flow back to this server for attachment to the global distributed transaction tree. Given the steps above it is now a simple process for the sending_request ORB interceptor to extract the host machine IP address for the target object (which it already accesses to determine if the target object_ is_a Costransactions::TransactionalObject) as above and consult its table of already created remote subordinate coordinators. It thus determines if there is a subordinate coordinator involved with the transaction already present on the same machine as the target object the request is flowing to.

If there is already a registered coordinator on the target object machine instead of sending its own object reference in the propagation context the superior coordinator substitutes the object reference of the subordinate coordinator that already exists 'locally' on the same machine as the target object. If that transactional flow results in any involvement of resource registrations these will automatically flow to the subordinate coordinator on the same machine.

Figure 4:
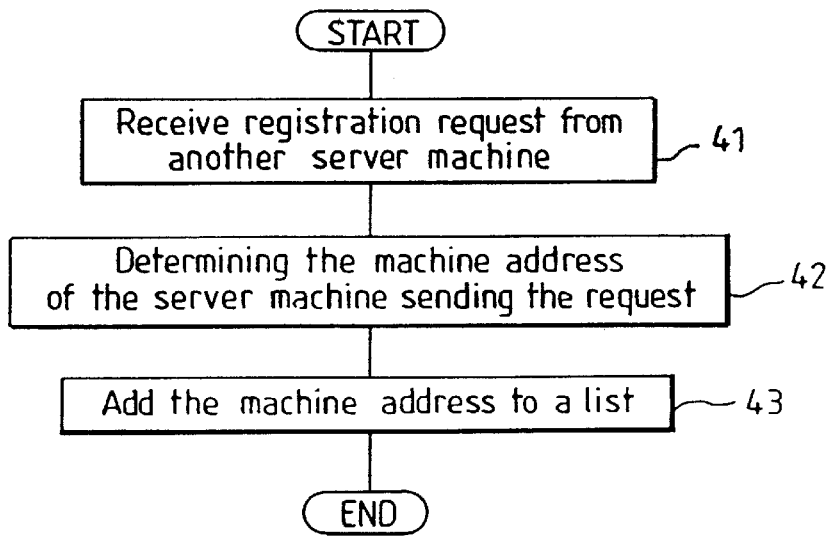
FIG. 4 is a flowchart showing the steps involved within a server, according to a preferred embodiment of the present invention.

To summarize, the steps being carried out by the server machine 31 which includes the superior coordinator object 311 when a registration request is received are illustrated in the flowchart of FIG. 4.

At step 41, the server machine 31 receives a registration request from server machine 32. At step 42, the server machine 31 determines the machine address (e.g., IP address) of the server machine 32. At step 43, the server machine 31 adds the machine address of the server machine 32 to a list, the list keeping track of which server machines have sent registration requests to the server machine 31.

Figure 5:
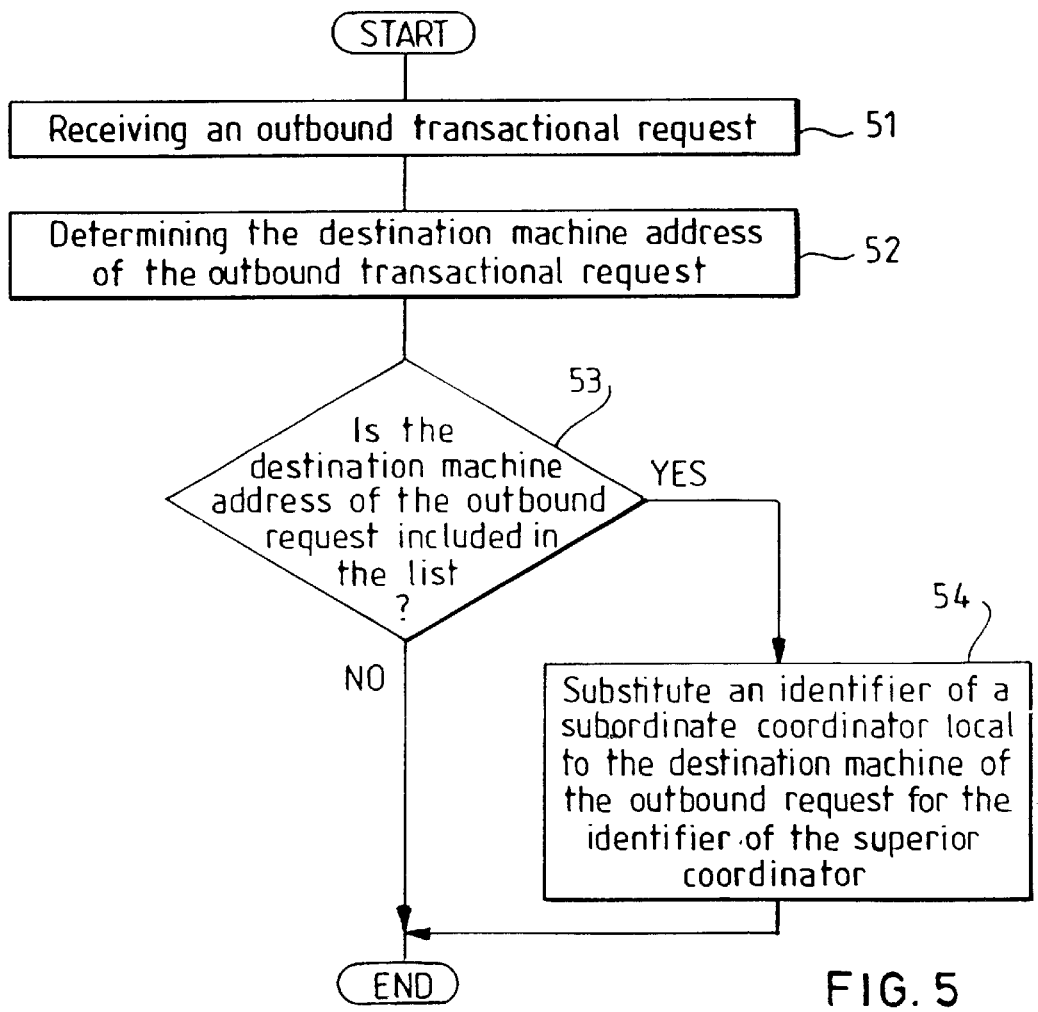
FIG. 5 is a flowchart showing the steps involved within a server when an outbound transactional request is received, according to a preferred embodiment of the present invention.

Further, the steps being carried out by a server process running in the server machine 31 which includes the superior coordinator object 311 when an outbound transactional request (a request destined for a process outside of the server process which includes the superior coordinator object 311) is received are illustrated in the flowchart of FIG. 5. While the process that includes the coordinator object 311 is described below as "receiving" the outbound transactional request, this process could also generate the request internally to the process in some embodiments of the invention. The more normal case, however, is when the process receives the outbound request from another process.

At step 51, the server machine 31 receives an outbound transactional request (e.g, from a client machine, not shown, or from a client process running on the server machine 31, or from another server process) which designates that a resource on a different server machine is to be accessed and thus involved in the transaction. At step 52, the server machine 31 determines the destination machine address of the outbound transactional request. For example, if the outbound request is requesting that a resource object located on server machine 32 be accessed as a part of the transaction, then the destination machine address of the outbound transactional request is the address of server machine 32.

At step 53, the server machine 31 determines whether the destination machine address of the outbound request is included in the list that was added to at step 43 of FIG. 4. That is, a determination is made as to whether the server machine 31 has ever received a registration request (e.g., step 41) from the destination server machine identified in the outbound transactional request. In our example, the destination server machine 32 has indeed sent a registration request to the server machine 31. If the destination machine address of the outbound request is included in the list (as is the case in our example), then the server machine 31 substitutes an identifier of a subordinate coordinator local to the destination machine of the outbound request for the identifier of the superior coordinator. Alternatively, if the destination machine address of the outbound request is not included in the list, the identifier of the superior coordinator is left in the outbound request.

By performing this substitution (following the YES branch of step 53), a subordinate coordinator 3221 which has not yet made a registration request to the superior coordinator 311 but which is located on the same server machine 32 as another subordinate coordinator 3211 which has already made a registration request to the superior coordinator 311, will send data flows to the subordinate coordinator 3211 rather than sending such data flows directly to the superior coordinator 311. This cuts down significantly on the number of cross-machine data flows and thus greatly reduces the amount of network traffic.

The preferred embodiment of the present invention involves a number of different steps as explained above, none of which is expensive in terms of design or implementation effort, CPU cycles of a running system or network traffic.

The result is a greatly reduced number of cross machine messages in the execution of a typical business transaction in a distributed Costransaction system such as IBM's Component Broker product in what is envisaged to be a fairly common scenario for the distribution of the 'three tiers' architecture.

Additionally, the steps taken will never result in a less optimum commit tree than is currently built and the processing involved will have minimal performance impact on a running system regardless of whether or not it benefits from the attempted optimisation.

We claim:

1. A first server data processing apparatus for use in coordinating a distributed transaction which is carried out by a plurality of server data processing apparatuses, the first apparatus comprising:

means for receiving a registration request from a second server data processing apparatus;

means for determining a machine address of the second server data processing apparatus that sent the registration request;

means for keeping a list of the machine addresses of server data processing apparatuses that send registration requests to said first apparatus;

means for determining the destination machine address of an outbound transactional request;

means for determining whether the destination machine address of the outbound transactional request is included in the list of machine addresses kept by the means for keeping; and means for, when the destination machine address of the outbound transactional request is included in the list of machine addresses kept by the means for keeping, substituting an identifier in the outbound transaction request identifying a transaction coordinator located on the first server apparatus with an identifier identifying a transaction coordinator located on the server apparatus having the destination machine address of the outbound transactional request.

2. The apparatus of claim 1 wherein the transaction coordinator located on the first server apparatus is a superior coordinator and the transaction coordinator located on the server apparatus having the destination machine address of the outbound transactional request is a subordinate coordinator.

3. The apparatus of claim 1 wherein the distributed transaction is carried out by the server apparatuses via an implementation of the Common Object Request Broker Architecture's Object Transaction Service.

4. The apparatus of claim 1 wherein the plurality of server data processing apparatuses are interconnected via the Internet.

5. The apparatus of claim 4 wherein said machine addresses are designated via Internet Protocol addresses.

6. A method of operating a first server data processing apparatus for use in coordinating a distributed transaction which is carried out by a plurality of server data processing apparatuses the method comprising steps of:

receiving a registration request from a second server data processing apparatus;

determining a machine address of the second server data processing apparatus that sent the registration request;

keeping a list of the machine addresses of server data processing apparatuses that send registration requests to said first apparatus;

determining the destination machine address of an outbound transactional request;

determining whether the destination machine address of the outbound transactional request is included in the list of machine addresses kept by the keeping step; and when the destination machine address of the outbound transactional request is included in the list of machine addresses, substituting an identifier in the outbound transaction request identifying a transaction coordinator located on the first server apparatus with an identifier identifying a transaction coordinator located on the server apparatus having the destination machine address of the outbound transactional request.

7. The method of claim 6 wherein the transaction coordinator located on the first server apparatus is a superior coordinator and the transaction coordinator located on the server apparatus having the destination machine address of the outbound transactional request is a subordinate coordinator.

8. The method of claim 6 wherein the distributed transaction is carried out by the server apparatuses via an implementation of the Common Object Request Broker Architecture's Object Transaction Service.

9. The method of claim 6 wherein the plurality of server data processing apparatuses are interconnected via the Internet.

10. The method of claim 9 wherein said machine addresses are designated via Internet Protocol addresses.

11. A program storage device readable by a machine, tangibly embodying a program of instructions executable by the machine to perform the method steps of claim 6.

* * * * *